(12) United States Patent
Goodwin, III

(10) Patent No.: US 6,256,615 B1
(45) Date of Patent: Jul. 3, 2001

(54) METHOD OF ASSIGNING ELECTRONIC SHELF LABELS TO PRICE LOOKUP FILE ITEMS

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/338,055

(22) Filed: Nov. 10, 1994

(51) Int. Cl.[7] .................................................. G06F 17/60
(52) U.S. Cl. .................................................................. 705/20
(58) Field of Search ..................................... 364/401, 403; 235/383, 385, 462.15, 472.01, 375; 705/20, 21, 14, 16, 23, 26, 411, 410; 340/825.35, 825.52, 825.55

(56) References Cited

U.S. PATENT DOCUMENTS

| | | | |
|---|---|---|---|
| 4,500,880 | * | 2/1985 | Gomersall ........................ 340/825.35 |
| 4,783,740 | * | 11/1988 | Ishizawa et al. ...................... 364/403 |
| 4,879,756 | * | 11/1989 | Stevens et al. . | |
| 4,888,709 | * | 12/1989 | Revesz et al. ........................ 364/401 |
| 4,962,466 | * | 10/1990 | Revesz et al. . | |
| 5,006,996 | * | 4/1991 | Nakamura et al. .................. 364/478 |
| 5,095,195 | | 3/1992 | Harman et al. ...................... 235/381 |
| 5,111,196 | | 5/1992 | Hunt .............................. 340/825.35 |
| 5,113,349 | * | 5/1992 | Nakamura et al. .................. 364/478 |
| 5,172,314 | | 12/1992 | Poland et al. ....................... 364/401 |
| 5,198,644 | * | 3/1993 | Pfeiffer et al. ...................... 235/383 |
| 5,241,467 | | 8/1993 | Failing et al. ....................... 364/401 |
| 5,250,789 | | 10/1993 | Johnsen ............................... 235/383 |
| 5,839,116 | * | 11/1998 | Goodwin, III ........................ 705/20 |
| 5,999,913 | * | 12/1999 | Goodwin, III ........................ 705/20 |
| 6,021,395 | * | 2/2000 | Goodwin, III ........................ 705/20 |
| 6,047,263 | * | 4/2000 | Goodwin, III ........................ 705/20 |
| 6,173,268 | * | 1/2001 | Goodwin, III ........................ 705/20 |

FOREIGN PATENT DOCUMENTS

| | | |
|---|---|---|
| 0568180 | 11/1993 | (EP) . |
| 02000097754A | * 4/2000 | (JP) . |
| 9305475 | 3/1993 | (WO) . |
| 9523382 | 8/1995 | (WO) . |

OTHER PUBLICATIONS

Making Labels with a computer; Pete Scisco; Office Systems, Georgetwon; vol. 16, Mar. 1999.*

* cited by examiner

Primary Examiner—James P. Trammell
Assistant Examiner—Pierre Eddy Elisca
(74) Attorney, Agent, or Firm—Paul W. Martin

(57) ABSTRACT

A price maintenance system and method in which price information entered into or read from a price-lookup file is shared to avoid price mismatch. The price-lookup file and price changes to the price-lookup file are shared by a point-of-service system including a bar code scanner, and a routine for printing labels. The system includes a computer coupled to the point-of-service system which updates the prices within the price-lookup file and sends the updated prices to the label printing routine for printing by a printing system. An electronic shelf label system may also share the price-lookup file and price changes to the price-lookup file.

16 Claims, 3 Drawing Sheets

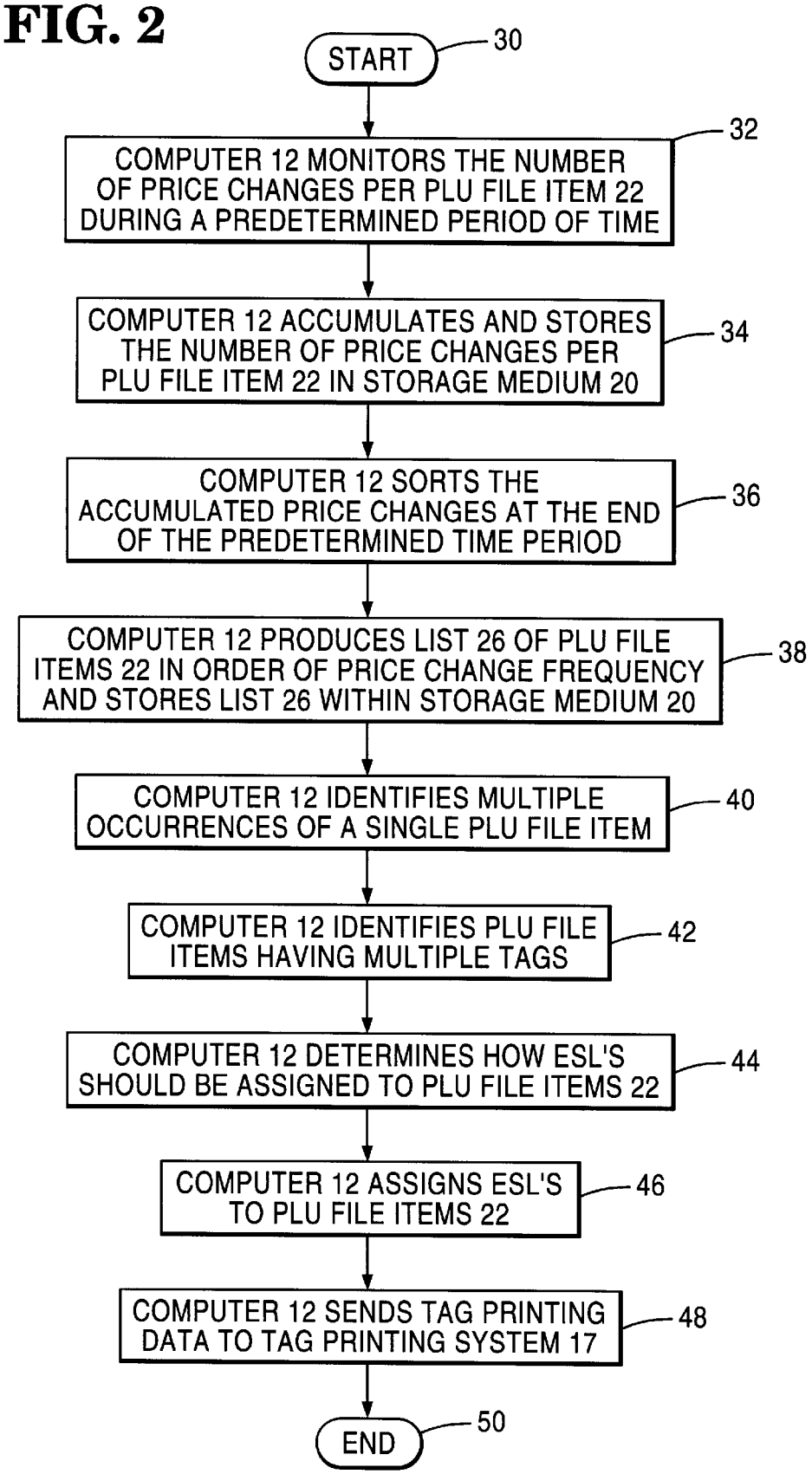

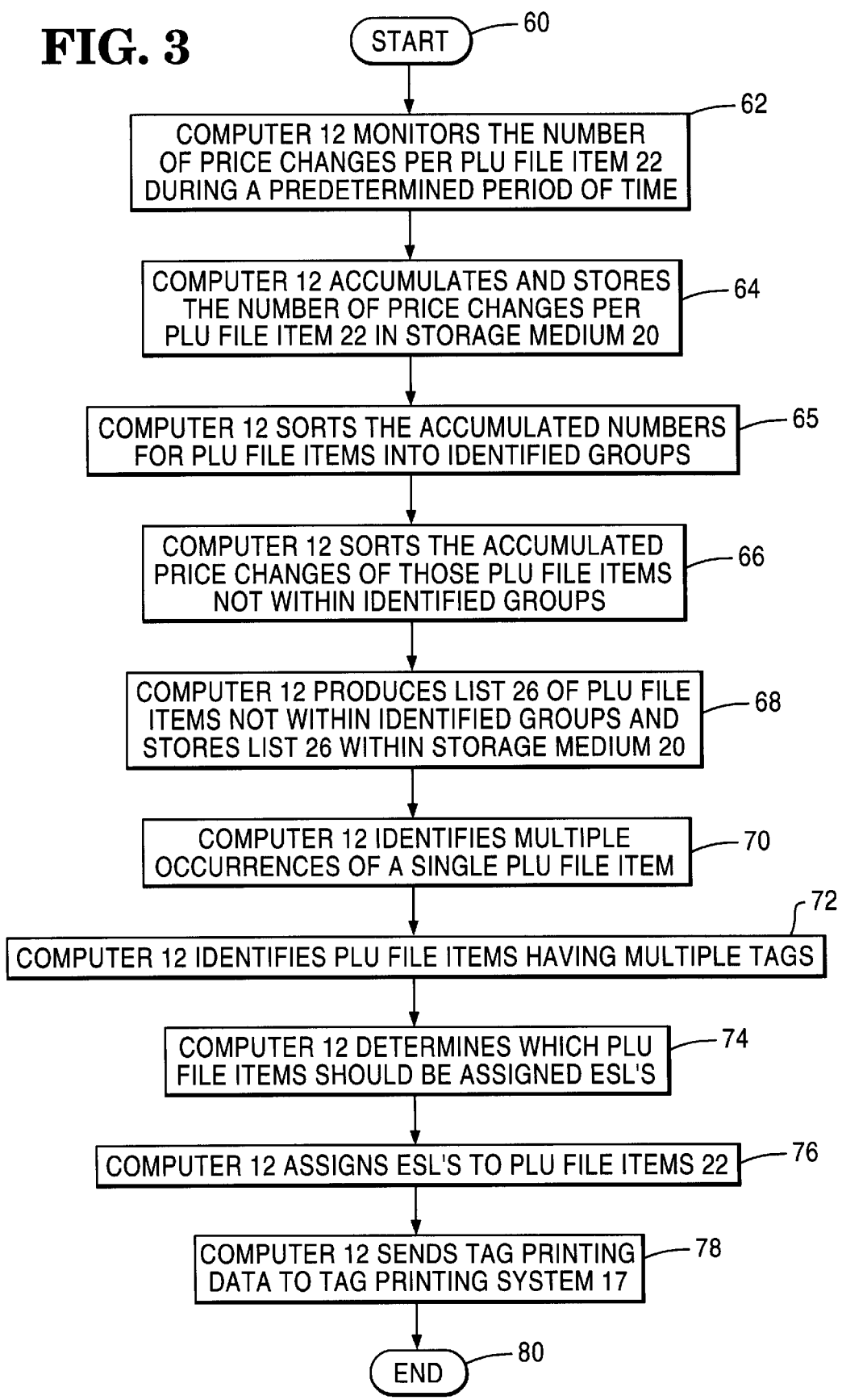

METHOD OF ASSIGNING ELECTRONIC SHELF LABELS TO PRICE LOOKUP FILE ITEMS

BACKGROUND OF THE INVENTION

The present invention relates to shelf label systems, and more specifically to a method of assigning electronic shelf labels to price-lookup file items.

In a traditional retail store, bar code scanners rely on price information maintained within a price-lookup (PLU) file. The PLU file is typically stored in a single location at host server.

Electronic shelf label (ESL) systems typically include a plurality of electronic displays. The electronic displays are coupled to a central server from where prices for all of the displays can be changed.

In a typical installation, one electronic shelf label is assigned to each PLU item in the store. Decisions regarding ESL assignments are typically made by store personnel. The current process implemented by such personnel involves periodically scanning items within the store with a hand-held scanner and manually recording whether a price change occurred. Store personnel review the manually gathered statistics and determine ESL assignments. This method is expensive and time consuming.

Therefore, it would be desirable to provide a method for assigning electronic shelf labels to PLU file items which minimizes decisions by store personnel and maximizes a store's return on investment in the electronic shelf label system.

SUMMARY OF THE INVENTION

In accordance with the teachings of the present invention, a method of assigning electronic shelf labels to price-lookup file items is provided. The method includes the initial step of determining a price change frequency for each merchandise item by a computer. Then, in a first embodiment, the computer assigns electronic shelf labels to each merchandise item by a computer. Then, in a first embodiment, the computer assigns electronic shelf labels to items having a price change frequency greater than a predetermined minimum price change frequency. In a second embodiment, the computer assigns a fixed number of electronic shelf labels to items, in order of price change frequency and starting with the largest price change frequency, until the electronic shelf labels are exhausted. Finally, in a third embodiment, the computer classifies the merchandise items into a plurality of groups, and assigns the electronic shelf labels to groups containing items having a price change frequency greater than a predetermined minimum price change frequency.

The computer recognizes multiple instances of electronic shelf labels for the same PLU file item, and multiple tags for the same PLU file item. The computer sends tag printing data to a printing system.

It is accordingly an object of the present invention to provide a method of assigning electronic shelf labels to price-lookup file items.

It is another object of the present invention to provide a method of assigning electronic shelf labels to price-lookup file items which assigns electronic shelf labels only to items whose prices change at a frequency greater than a predetermined frequency.

It is another object of the present invention to provide a method of assigning electronic shelf labels to price-lookup items which maximizes a store's return on investment in an electronic shelf label system.

It is another object of the present invention to provide a method of assigning electronic shelf labels to price-lookup items which minimizes decisions by store personnel regarding ESL assignments.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating a first embodiment of the method of the present invention; and FIG. 3 is a flow diagram illustrating a second embodiment of the method of the present invention.

DETAILED DESCRIPTION OF THE PREFERRED EMBODIMENT

Figure 1:
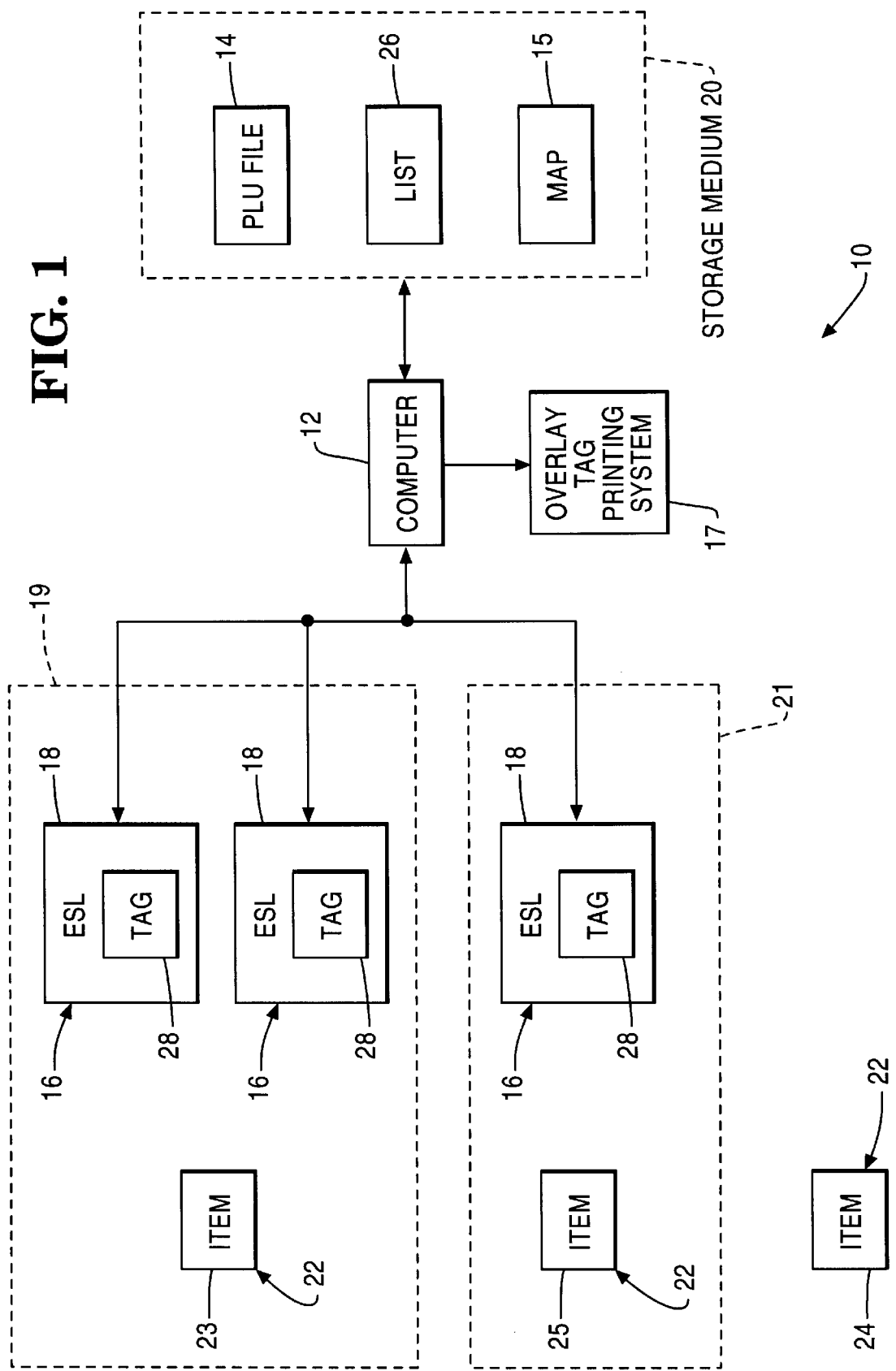
FIG. 1 is a block diagram of a computer network within a store.

Referring now to FIG. 1, store system 10 includes computer 12, price-lookup (PLU) file 14, electronic shelf label (ESL) system 16, and tag overlay printing system 17.

Computer 12 analyzes price change information for PLU file items 22 and produces a sorted list 26. List 26 may include PLU file items 22 in order of price change, or companies having PLU file items 22, or categories of PLU file items 22, or any other grouping of PLU file items 22. Computer 12 assigns ESLs 18 under the method of the present invention and passes ESL and ESL tag information to tag printing system 17. Group 21 represents an assignment of one ESL to one PLU file item. Computer 12 may be a host computer in a store network.

Computer 12 also identifies multiple occurrences of the same PLU file item. Group 19 represents a single PLU file item which is located at two different places within the store and which requires multiple ESLs having the same tag at each location. Computer 12 also identifies PLU file items requiring multiple ESLs, each having a different tag 28, from map 15 within storage medium 20.

PLU file 14 contains price information about store file items 22. The price information for one file item may change at a frequency different than any other file item. PLU file 14 is stored within a storage medium 20 associated with computer 12.

ESL system 16 includes a plurality of ESLs 18 assigned to PLU file items 22. Under one embodiment of the present invention, only those file items 22 that evidence a price change frequency greater than a predetermined minimum are assigned ESLs 18. Alternatively, for a given number of ESLs 18, only the file items 22 which evidence the highest price change frequency are assigned ESLs 18. Under either method, the possibility exists that an item 25 may be assigned a single ESL 18, that an item 24 may not be assigned one of ESLs 18, or that an item 23 may be assigned multiple ESLs 18.

Each of ESLs 18 includes a printed tag or overlay 28 for displaying information about PLU file items 22. Tag printing system 17 prints tags 28 after ESLs 18 are assigned to PLU file items 22. Printing system may be located at the point of manufacture of ESLs 18 or at some other location outside of the store.

Thus, turning now to FIG. 2, a first embodiment of the method of the present invention begins with START 30.

In step 32, computer 12 monitors the number of price changes per PLU item during a predetermined period of time.

In step 34, computer 12 accumulates and stores the number of price changes from step 32 in storage medium 20.

In step 36, computer 12 sorts the accumulated price changes from least number of price changes to most number of price changes at the end of the predetermined time period.

In step 38, computer 12 produces list 26 of PLU file items 22 in order of price change frequency and stores list 26 in storage medium 20.

In step 40, computer 12 identifies multiple occurrences of a single PLU file item within the store. Such PLU file items would each require one of ESLs 18, if that PLU file item evidenced a high enough price change frequency. Computer 12 employs map 15 of PLU file items 22 within the store to determine the multiple occurrences. Map 15 may be a standard store scan file or a standard planogram file.

In step 42, computer 12 identifies PLU file items having multiple tags from map 15. During creation of map 15, a PLU file item requiring multiple ESLs must be scanned as many times as the number of paper shelf tags to be replaced by the ESLs.

In step 44, computer 12 determines how ESLs 18 should be assigned to PLU file items 14 on the list. The first embodiment of the present invention envisions at least two methods for determining how to assign ESLs 18.

A first method assumes a given number of ESLs 18 and determines that PLU file items 22 should be assigned ESLs 18, in order starting from the PLU file item having the highest price change frequency, until ESLs 18 are exhausted.

A second method assumes that PLU file items will be assigned ESLs only if their price change frequencies exceed a predetermined minimum price change frequency. If all of the PLU file items have price change frequencies, then all PLU file items will be assigned ESLs. This method assumes that a predetermined percentage of price change coverage is desirable.

In each case, an arbitrarily chosen PLU file item may be entered into computer 12 if there is a tie between PLU file items. The choice may be based on a predetermined preference for one manufacturer over another, or one category over another.

In step 46, computer 12 assigns ESLs 18 to PLU file items 22 in accordance with the determination of step 44.

In step 48, computer 12 sends the map of ESL and overlay tag printing data to overlay tag printing system 17 and the method ends at END 50.

Turning now to FIG. 3, a second embodiment of the present invention begins with START 60.

In step 62, computer 12 monitors the number of price changes per PLU item during a predetermined period of time.

In step 64, computer 12 accumulates and stores the number of price changes from step 62 in storage medium 20.

In step 65, computer 12 sorts the accumulated numbers of price changes for PLU file items into identified groups. A group may be a manufacturer, a category of products (e.g., perfumes), or any other classification of PLU file items 22. A sorting by manufacturer is the simplest method of grouping, since the first five digits in a universal product code (UPC) identify the manufacturer. A sort by some other category requires that the category information be made available to computer 12. Category information may be manually added to PLU file 14.

Step 65 may sort all of the numbers of price changes into groups or only some of the numbers of price changes into groups, depending on the number of identified groups. For example, computer 12 may sort the numbers of price changes for PLU file items identified with a predetermined manufacturer into a group associated with that manufacturer, leaving the numbers of price changes for remaining PLU file items unsorted by group.

The effect of the sort into groups presupposes that all of the PLU file items within the identified groups will be assigned ESLs. The groups may be identified primarily from historical price change frequency information, reflecting groups of PLU file items exhibiting high price change frequencies.

This sort also presupposes there are plenty of ESLs to assign to all of the PLU file items within all of the identified groups. In cases where all of the PLU file items have been grouped, but there are not enough ESLs to assign, the same method for ranking individual PLU file items may be used to rank groups of PLU file items. That is, one way to rank groups would be to determine the average of price change frequency of each group and assign ESLs starting with the group having the highest average.

In step 66, computer 12 sorts the accumulated price changes a second time, except that the price changes for PLU file items sorted within groups are not counted.

In step 68, computer 12 produces list 26 of PLU file items not associated with a group and stores list 26 in storage medium 20.

In step 70, computer 12 identifies multiple occurrences of a single PLU file item within the store, whether that PLU file item is in an identified group or not. Such PLU file items would each require one of ESLs 18, if that PLU file item evidenced a high enough price change frequency. Computer 12 employs map 15 of PLU file items 22 within the store to determine the multiple occurrences. Map 15 may be a standard store scan file or a standard planogram file.

In step 72, computer 12 identifies PLU file items having multiple tags from map 15, whether those PLU file items are in identified groups or not. During creation of map 15, a PLU file item having multiple tags must be scanned as many times as there are tags for that PLU file item.

In step 74, computer 12 determines how ESLs 18 should be assigned to PLU file items 14 on list 26. The first embodiment of the present invention envisions two methods for determining how to assign ESLs 18, which are similar to the methods of the first embodiment.

A first method assumes a given number of ESLs 18 and determines that the PLU file items 22 should be assigned ESLs 18, in order starting within the highest price change frequency.

A second method assumes that PLU file items will be assigned ESLs only if the price change frequencies of the PLU file items each exceed a predetermined minimum price change frequency.

In each case, an arbitrarily chosen PLU file item may be entered into computer 12 if there is a tie between PLU file items. The choice may be based on a predetermined preference for one manufacturer over another, or one category over another.

In step 76, computer 12 assigns ESLS 18 to PLU file items 22 in accordance with the determination of step 74.

In step 78, computer 12 sends the map of ESL and tag printing data to tag printing system 17 and the method ends at END 80.

Both embodiments of FIGS. 2 and 3 may be implemented indefinitely to optimize ESL assignments in a dynamic store environment.

Although the present invention has been described with particular reference to certain preferred embodiments thereof, variations and modifications of the present invention can be effected within the spirit and scope of the following claims.

What is claimed is:

1. A method of assigning electronic shelf labels to merchandise items within a price look-up table comprising the steps of:
   (a) determining a price change frequency for each merchandise item by a computer; and
   (b) assigning the electronic shelf labels to items having a price change frequency greater than a predetermined minimum price change frequency by the computer.

2. The method as recited in claim 1, further comprising the steps of:
   (c) identifying multiple occurrences of a single merchandise item within a store by the computer; and
   (d) assigning one electronic shelf label to each occurrence within the store by the computer if the single merchandise item has a price change frequency greater than the predetermined minimum price change frequency.

3. The method as recited in claim 1, wherein step (a) comprises the substeps of:
   (a-1) monitoring price changes for each merchandise item during a predetermined time period by the computer;
   (a-2) accumulating a number of price changes for each merchandise item during the predetermined time period by the computer; and
   (a-3) sorting the accumulated numbers of price changes by size by the computer.

4. The method as recited in claim 1, further comprising the steps of:
   (c) providing tag printing data for the assigned electronic shelf labels; and
   (d) sending the tag printing data to a printing system by the computer.

5. The method as recited in claim 4, further comprising the steps of:
   (e) identifying a merchandise item requiring multiple electronic shelf labels and a plurality of different tags for the multiple electronic shelf labels;
   (f) providing tag printing data for the plurality of different tags; and
   (g) sending the tag printing data for the plurality of different tags to a printing system by the computer.

6. The method as recited in claim 4, further comprising the steps of:
   (d) identifying multiple occurrences of a single merchandise item within a store by the computer; and
   (e) assigning one electronic shelf label to each occurrence within the store by the computer.

7. The method as recited in claim 4, wherein step (a) comprises the substeps of:
   (a-1) monitoring price changes for each merchandise item during a predetermined time period by the computer;
   (a-2) accumulating a number of price changes for each merchandise item during the predetermined time period by the computer; and
   (a-3) sorting the accumulated numbers of price changes by size by the computer.

8. A method of assigning electronic shelf labels to merchandise items within a price look-up table comprising the steps of:
   (a) determining a price change frequency for each merchandise item by a computer;
   (b) providing a fixed number of the electronic shelf labels; and
   (c) assigning the electronic shelf labels to items, in order of price change frequency and starting with the largest price change frequency, until the electronic shelf labels are exhausted by the computer.

9. The method as recited in claim 8, further comprising the steps of:
   (d) providing tag printing data for the assigned electronic shelf labels; and
   (e) sending the tag printing data to a printing system by the computer.

10. The method as recited in claim 9, further comprising the steps of:
    (f) identifying a merchandise item requiring multiple electronic shelf labels and a plurality of different tags for the multiple electronic shelf labels;
    (g) providing tag printing data for the plurality of different tags; and
    (h) sending the tag printing data for the plurality of different tags to a printing system by the computer.

11. A method of assigning electronic shelf labels to merchandise items within a price look-up file comprising the steps of:
    (a) determining a price change frequency for each merchandise item by a computer;
    (b) classifying the merchandise items into a plurality of groups; and
    (c) assigning the electronic shelf labels to groups containing items having a price change frequency greater than a predetermined minimum price change frequency by the computer.

12. The method as recited in claim 11, further comprising the steps of:
    (d) identifying multiple occurrences of a single merchandise item within a store and within one of the groups containing items having a price change frequency greater than a predetermined minimum price change frequency by the computer; and
    (e) assigning one electronic shelf label to each occurrence within the store by the computer.

13. The method as recited in claim 11, wherein step (a) comprises the substeps of:
    (a-1) monitoring price changes for each merchandise item during a predetermined time period by the computer;
    (a-2) accumulating a number of price changes for each merchandise item during the predetermined time period by the computer; and
    (a-3) sorting the accumulated numbers of price changes by size by the computer.

14. The method as recited in claim 11, wherein step (b) comprises the substep of:
    (b-1) classifying the merchandise items by manufacturer.

15. The method as recited in claim 11, further comprising the steps of:
    (d) providing tag printing data for the assigned electronic shelf labels; and
    (e) sending the tag printing data to a printing system by the computer.

16. The method as recited in claim 15, further comprising the steps of:
    (f) identifying a merchandise item requiring multiple electronic shelf labels and a plurality of different tags for the multiple electronic shelf labels;
    (g) providing tag printing data for the plurality of different tags; and
    (h) sending the tag printing data for the plurality of different tags to a printing system by the computer.

* * * * *